United States Patent Office 3,304,441
Patented Feb. 14, 1967

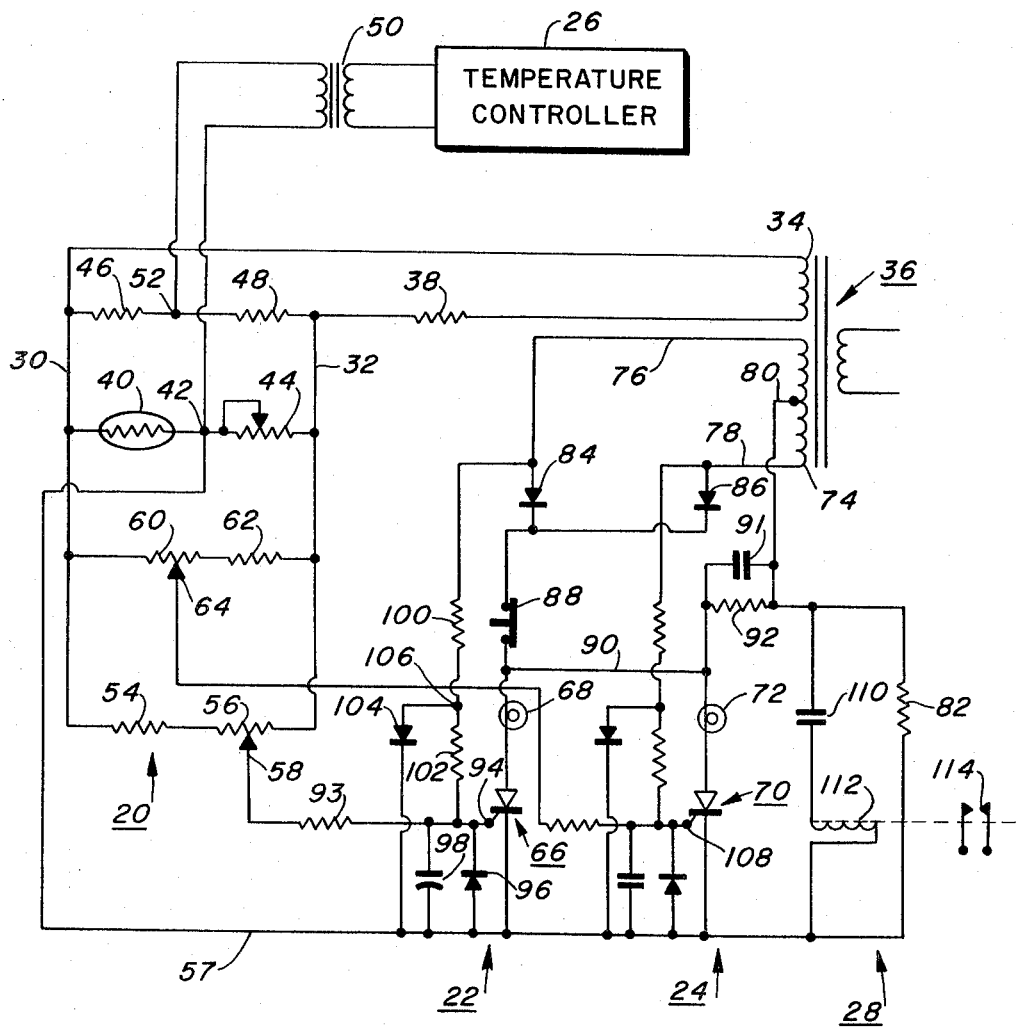
INVENTOR.
THOMAS E. PELT
BY Kelly O. Corley
ATTORNEY

3,304,441
PARAMETER VARIATION MONITOR
Thomas E. Pelt, Pensacola, Fla., assignor to Monsanto Company, St. Louis, Mo., a corporation of Delaware
Filed July 31, 1964, Ser. No. 386,510
4 Claims. (Cl. 307—88.5)

The present invention relates to circuitry for responding to variations of a parameter beyond preset limits. More particularly the present invention relates to a monitor for responding to variations of a parameter beyond either limit of a range of variations.

Many applications occur where it is desired to monitor or detect variations of a parameter, such as temperature or pressure, from a given value. An example would be as an adjunct or addition to temperature controllers, which in some industries are used in large numbers. In such applications, it is essential that the monitor be both reliable and economical.

Accordingly, a primary object of the invention is to provide a monitoring circuitry capable of responding to parameter variations beyond the limits of a range of variations.

A further object is to provide circuitry of the above character in which the preset limits are separately and independently adjustable about a setpoint.

A further object is to provide circuitry of the above character in which the setpoint is separately and independently adjustable.

A further object is to provide circuitry of the above character which is capable of using the same parameter sensor as is used by the apparatus being monitored.

A further object is to provide circuitry of the above character which is continuous in operation so as to provide continuous monitoring.

A further object is to provide circuitry of the above character which is economical and reliable in operation.

For a more complete understanding of the nature and objects of the invention, reference should be had to the following detailed description taken in connection with the accompanying drawing, in which the single figure is a schematic circuit diagram of the preferred embodiment of the invention.

Referring now generally to the figure, for simplicity of discussion the invention will be described as applied to monitoring of temperature, although the invention is not limited to this parameter.

The monitoring circuitry according to the present invention includes a bridge network 20 for generating the necessary signals for actuating separate high temperature limit indicator 22, low temperature limit indicator 24, and for optional temperature controller 26. An alarm or annunciator circuit 28 is energized when either the high limit indicator 22 or the low limit indicator 24 is actuated.

Referring more specifically to the figure, bridge network includes a pair of bridge-energizing conductors 30 and 32, which are energized from secondary winding 34 of power supply transformer 36. A series resistor 38 is connected between secondary winding 34 and conductor 32 to limit the supply voltage appearing across conductors 30 and 32.

A thermistor 40 is physically located to sense the parameter being monitored, and has one terminal connected to conductor 30 and its remaining terminal connected to signal junction 42. A variable resistor 44 is connected between signal junction 42 and conductor 32, thus forming with thermistor 40 a common leg for a temperature controller bridge, a high-limit bridge, and a low-limit bridge, as will be set forth below. Resistor 38 limits the current which may flow through thermistor 40 when resistor 44 is adjusted for minimum resistance.

The remaining leg for the temperature controller bridge is provided by a first pair of resistors 46 and 48, which are connected in series with each other across conductors 30 and 32. The temperature-responsive signal for temperature controller 26 is supplied through a transformer 50, the primary winding of which is connected between signal junction 42 and the controller reference junction 52 between resistors 46 and 48. Temperature controller 26 may be of any known type, and indeed is not required for operation of the monitoring apparatus of the present invention. An exemplary temperature controller suitable for use with this invention is disclosed in U.S. Patent No. 3,098,920.

The remaining leg for the high-limit bridge includes resistor 54 and potentiometer 56 connected in series in the order named between conductor 30 and conductor 32. Signal junction 42 is connected to a common or reference conductor 57. The voltage difference between movable tap 58 on potentiometer 56 and common conductor 57 provides a high-limit signal which is zero when the high-limit bridge is balanced. If the temperature of the thermistor 40 increases above this point, the high-limit signal will have a given phase relationship to the voltage appearing across the terminals of secondary winding 34, and will have the opposite phase relationship if the temperature of thermistor 40 decreases below this point.

Similarly the remaining leg for the low-limit bridge includes potentiometer 60 and resistor 62 connected in series in the order named between conductor 30 and conductor 32. The voltage difference between movable tap 64 on potentiometer 60 and common conductor 57 provides the low-limit signal. When the low-limit bridge is balanced, the low-limit signal is zero, and as the low-limit bridge is unbalanced due to an increase in temperature of thermistor 40, the low-limit signal will have the given phase relationship noted above with respect to the voltage appearing across the terminals of secondary winding 34, and similarly will have the opposite phase relationship when the temperature of thermistor 40 decreases from the point at which the bridge is balanced. Taps 58 and 64 are adjusted so that the low-limit bridge produces an effective low-limit signal at some limiting temperature lower than that limiting temperature at which the high-limit bridge produces an effective high-limit signal.

The high-limit indicator 22 and the low-limit indicator 24 include a silicon controller rectifier (SCR) 66 in series with an indicator light 68, and an SCR 70 in series with an indicator 72, respectively. The high and low limit signals are compared in phase to the power supply voltage, and trigger the appropriate SCR when of the proper phase and above a given amplitude.

Power is supplied to the high-limit indicator 22 and the low-limit indicator 24 through secondary winding 74 on transformer 36. Secondary winding 74 has end terminals 76 and 78, and a center tap 80. Center tap 80 is connected through resistance 82 to the common conductor 57. End terminals 76 and 78 are connected through respective rectifiers 84 and 86 through a normally closed switch 88 to a conductor 90. Indicator light 68 and SCR 66 are connected in series between conductor 90 and common conductor 57, and indicator light 72 and SCR 70 are likewise connected in series between conductor 90 and common conductor 57. It will be apparent to those skilled in the art that a full-wave rectified positive voltage appears on the anodes of SCR's 66 and 70 and that these SCR's may be triggered into conduction when a positive signal of appropriate magnitude is applied to their respective gate electrodes. This full-wave rectified voltage is filtered to some degree by a capacitor 91 and a resistor 92 connected in parallel between conductor 90 and center tap 80.

The high-limit signal is compared in phase to a bias voltage derived from the power supply. The high-limit signal is supplied through resistor 93 to gate electrode 94 of SCR 66. A diode 96 has its cathode connected to gate 94 and its anode connected to common conductor 57, to clip the negative portion of the high-limit signal and to prevent a large reverse voltage on gate 94. A capacitor 98 bypasses diode 96 and prevents triggering of SCR 66 by a transient signal. A bias voltage is derived from the power supply and mixed with the clipped high-limit signal so that the signal actually appearing on gate 94 is a summation of the high-limit signal and the bias voltage. A pair of serially connected resistors 100 and 102 connect end terminal 76 to gate 94. A clamping diode 104 has its anode connected to the junction 106 between resistors 100 and 102 and its cathode connected to common conductor 57. Thus, the positive portions of the bias voltage are clipped, and only the negative half cycles are transmitted through resistor 102 to gate 94.

Secondary windings 34 and 74 are so poled that when the temperature of thermistor 40 is below the balance point of the high-limit bridge, the positive pulses or half-cycles of the high-limit signal will occur simultaneously with the much larger negative bias pulses transmitted through resistor 102. The resulting large negative summation signal will be clipped by diode 96 and will be unable to trigger SCR 66. However, as the temperature of thermistor 40 increases, the high-limit signal appearing on tap 58 will decrease in amplitude and will ultimately reverse in phase as the high-limit bridge becomes unbalanced in the opposite direction. Under these conditions, the positive half-cycles of the high-limit signal will occur during the time intervals between successive negative bias pulses, i.e., the positive half-cycles of the high-limit signal will not be cancelled by the negative half-cycles of the bias signal. The resulting positive pulses appearing on gate 94, when of sufficient amplitude, will trigger SCR 66 into conduction and energize light 68. Except that the bias voltage is derived from end terminal 78 so that it is out of phase with the bias voltage applied to SCR 66, and that the low-limit signal which is summed at gate 108 is derived from tap 64 rather than tap 58, the low-limit indicator circuit 24 components and connections are generally identical with those on high-limit indicator circuit 22, and will not be discussed in detail. Since the bias signals are 180° out of phase with one another, the positive half-cycles of the signal on tap 64 will coincide with negative bias pulses on gate 108 when thermistor 40 has a temperature higher than the balance point of the low-limit bridge, but will occur between these negative bias pulses when the temperature of thermistor 40 is below the balance point.

It should be noted that the signal required to trigger the SCR's into conduction must exceed a certain threshold value, typically about one-half of a volt, and thus that either the high-limit or the low-limit bridge must be sufficiently unbalanced to produce a signal in excess of this threshold value before it can trigger the associated SCR into conduction. If the high-limit indicator 22 is required to be actuated at a temperature only slightly above the balance point of the temperature controller bridge, it may be necessary to adjust tap 58 so that the balance point of the high-limit bridge is actually somewhat below the balance point of the temperature controller bridge, in order to compensate for the threshold value required by SCR 66. For the same reasons, when low-limit indicator 24 is required to be actuated at a temperature only slightly below the balance point of the temperature controller bridge, it may be necessary to adjust tap 64 so that the balance point of the low-limit bridge is somewhat above the balance point of the temperature controller bridge.

When either SCR goes into conduction, the filtering action provided by capacitor 91 and resistor 92 maintains the instantaneous voltage on conductor 90 at a minimum level sufficiently high to prevent the SCR from turning "off" before conductor 90 is de-energized by opening of switch 88. Although this feature is not critical to all aspects of the invention, it is noted that resetting is considerably facilitated by connecting filter capacitor 91 between center tap 80 and the lower side of switch 88, as illustrated, rather than between center tap 80 and the upper side of switch 88. With the circuit as illustrated, capacitor 91 will discharge through the triggered SCR when switch 88 is opened, and will then recharge when switch 88 is closed. This prevents application of a step voltage to the SCR anodes. However, if capacitor 91 were connected to the upper side of switch 88, capacitor 97 would be fully charged. Closure of switch 88 would then apply a step voltage to the SCR anodes, which might re-trigger one or both of the SCR's and prevent resetting.

Annunciator circuit 28 is actuated when either of the SCR's conducts. Annunciator circuit 28 includes a capacitor 110 and an alarm relay winding 112 connected in series between center tap 80 and common conductor 57, i.e., connected in parallel with resistor 82. When either SCR conducts, capacitor 110 passes sufficient current to momentarily energize winding 112 and close relay contacts 114. Closures of contacts 114 may be used to sound an audible alarm, actuate a cut-down device to stop the process being monitored, or any other such function. If desired, capacitor 110 may be eliminated by connecting winding 112 directly to center tap 80 so as to provide continuous actuation of the relay rather than momentary actuation.

As initial adjustments for the apparatus, resistor 44 may be set to provide a desired signal at a given temperature set point as required for temperature controller 26, although it should be noted that the presence of controller 26 is unrelated to the operation of the monitoring circuitry proper. Tap 58 is then adjusted to define the upper limit of the permitted range of temperature variations, and tap 64 is then similarly adjusted to define the lower limit of the permitted range of temperature variation. With temperature controller 26 in operation, reset switch 88 is then opened to reset limit indicators 22 and 24. If then the temperature of thermistor 40 rises sufficiently to exceed the high-temperature limit, high-limit indicator 22 will be actuated as above described, and will remain actuated until reset switch 88 is again opened. Similarly, if the temperature of thermistor 40 decreases sufficiently to exceed the lower limit, low-limit indicator 24 will be actuated and will remain actuated until reset switch 88 is again opened. Annunciator circuit 28 will be actuated when either of circuits 22 and 24 are actuated.

It should be particularly noted that the present invention permits use of the same parameter sensor for the monitoring circuits 22 and 24 as is used for the controller circuit 26. This eliminates the requirement for tedious and expensive matching of the sensing devices such as thermistor 40. Although one could use two variable taps on a single voltage divider connected across conductors 30 and 32, rather than separate voltage dividers, each having its single variable tap 58 or 64, the invention has been disclosed with the latter arrangement for simplicity of discussion.

Although many minor modifications in the circuitry and in the component values will occur to those skilled in the art, the following exemplary table sets forth the preferred specific embodiment of the invention:

| | |
|---|---|
| Resistor 38 | oms 180 |
| Resistor 44 | kilohms 1 |
| Resistor 46 | do 4.7 |
| Resistor 48 | do 4.7 |
| Resistor 54 | do 6.8 |

| Component | Value | Unit |
|---|---|---|
| Resistor 56 | 10 | do |
| Resistor 60 | 10 | do |
| Resistor 62 | 6.8 | do |
| Resistor 82 | 390 | ohms |
| Resistor 92 | 4.7 | kilohms |
| Resistor 93 | 100 | do |
| Resistor 100 | 100 | do |
| Resistor 102 | 180 | do |
| Capacitor 91 | 5 | microfarads |
| Capacitor 98 | .001 | do |
| Capacitor 110 | 200 | do |
| SCR 66 | Type 3N58 | |
| SCR 70 | Type 3N58 | |
| Diode 96 | Type 1N457A | |
| Rectifier 84 | Type 1N536 | |
| Rectifier 86 | Type 1N536 | |
| Diode 104 | Type 1N34 | |

Thermistor 40 may be a Fenwald type-GA51M2T1.

There has been disclosed in the above specification and the accompanying drawing a monitoring circuit capable of responding to variations of a parameter beyond the limits of a preset range of variations. The set point within the range of variations is selectively adjustable by adjustment of variable resistor 44, and each of the preset limits is separately and independently adjustable by adjustment of the appropriate movable tap 58 or 64. The monitoring circuitry as disclosed is capable of using the same parameter sensor as is used by the apparatus being monitored. The circuitry of the present invention continuously monitors the parameter by the use of circuitry which is economical and reliable in operation.

It will thus be seen that the objects set forth above, among those made apparent from the preceding description, are efficiently attained and, since certain changes may be made in the above circuitry without departing from the scope of the invention, it is intended that all matters contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Monitoring circuitry comprising in combination:
    (a) an SCR having anode, gate and cathode electrodes,
    (b) an alternating current power supply having an end terminal and a further terminal,
    (c) means connecting said further terminal to a common conductor,
    (d) a load impedance,
    (e) means connecting said load impedance and the anode-cathode path of said SCR in series between a direct current power supply and said common conductor so that a positive direct current potential is applied to said anode,
    (f) signal means for applying to said gate electrode signals which are in phase with the potential on said end terminal in response to a first given condition and for applying to said gate electrode signals which are out of phase with said potential on said end terminal in response to a second condition,
    (g) and a biasing network for said gate electrode, said biasing network including:
        (1) first and second resistors connected in series between said end terminal and said gate electrode,
        (2) and means connecting the anode of a clamping diode to the junction between said first and said second resistors and connecting the cathode of said clamping diode to the cathode of said silicon control rectifier.

2. The monitoring circuitry defined in claim 1, further comprising a clipping diode having its cathode connected to said gate electrode and having its anode connected to said common conductor.

3. The monitoring circuitry defined in claim 2, further comprising a capacitor connected in parallel with said clipping diode.

4. Monitoring circuitry comprising in combination:
    (a) an SCR having anode, gate and cathode electrodes,
    (b) an alternating current power supply having an end terminal and a further terminal,
    (c) means connecting said further terminal to a common conductor,
    (d) a load impedance,
    (e) a rectifier,
    (f) means connecting said load impedance, said rectifier and the anode-cathode path of said SCR in series between said end terminal and said common conductor with said rectifier poled to apply a positive direct current potential to said anode,
    (g) means for triggering said SCR into conduction,
    (h) a reset switch connected in series between said rectifier and said anode electrode,
    (i) and a filter including a capacitor connected between said further terminal and a point between said anode and said reset switch.

References Cited by the Examiner

UNITED STATES PATENTS

| | | | |
|---|---|---|---|
| 2,629,073 | 2/1953 | Smith. | |
| 2,813,235 | 11/1957 | Clay | 236—13 X |
| 3,075,187 | 1/1963 | Richardson et al. | 340—213 |
| 3,127,589 | 3/1964 | Harris. | |
| 3,136,877 | 6/1964 | Heller | 219—499 |
| 3,179,814 | 4/1965 | Stoudenmire et al. | 307—88.5 |

OTHER REFERENCES

Solid State Products, "Bulletin D420-02," December 1959, pages 9 and 29 relied on.

Silicon Controlled Rectifier Manual, 2nd edition, General Electric Co., 1961, page 33 relied on.

ALDEN D. STEWART, *Primary Examiner.*